(12) United States Patent
Nishide et al.

(10) Patent No.: US 8,031,368 B2
(45) Date of Patent: Oct. 4, 2011

(54) IMAGE PROCESSING DEVICE

(75) Inventors: Yasushi Nishide, Ebina (JP); Ryuichi Ishizuka, Ebina (JP); Mari Kodama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 348 days.

(21) Appl. No.: 12/318,124

(22) Filed: Dec. 22, 2008

(65) Prior Publication Data
US 2009/0116050 A1 May 7, 2009

Related U.S. Application Data

(63) Continuation of application No. 11/706,361, filed on Feb. 15, 2007, now Pat. No. 7,471,419, which is a continuation of application No. 10/173,019, filed on Jun. 18, 2002, now Pat. No. 7,253,918.

(30) Foreign Application Priority Data

Jun. 20, 2001 (JP) .................................. 2001-187202

(51) Int. Cl.
*H04N 1/60* (2006.01)
*G06K 15/00* (2006.01)
(52) U.S. Cl. ........................................ 358/1.9; 358/1.18
(58) Field of Classification Search .................... 358/1.9, 358/1.15, 1.1, 1.16, 1.17, 1.18, 1.2, 1.3, 1.4, 358/1.5, 1.6, 1.7, 1.8, 1.11, 1.12, 1.13, 1.14, 358/468, 407, 500, 501, 518, 515, 517, 519, 358/2.1, 450, 527, 530, 531, 540, 3.29, 3.32; 382/162, 164, 167; 715/274, 275, 273, 243, 715/235; 347/2, 3, 5, 14, 23; 399/1, 8, 9, 399/39, 133, 166, 184

See application file for complete search history.

(56) References Cited

U.S. PATENT DOCUMENTS

| 5,559,933 A | 9/1996 | Boswell |
| 5,991,783 A | 11/1999 | Popa et al. |
| 6,035,059 A | 3/2000 | Kurosawa |

(Continued)

FOREIGN PATENT DOCUMENTS

JP         A-06-320802        11/1994

(Continued)

OTHER PUBLICATIONS

Yuko Hattori, "Desktop Publishing for Widows 95, Photoshop 3.0J: photo retouching software suitable for desktop publishing" (Adobe Systems), I/O vol. 21, No. 10, Kohgakusha Co., Ltd., Oct. 1, 1996, p. 59, ISSN0387-6675.

(Continued)

*Primary Examiner* — Dov Popovici
(74) *Attorney, Agent, or Firm* — Oliff & Berridge, PLC

(57) ABSTRACT

The present invention provides an image processing device which aims for appropriate settings and simplification of printing functions. In a print server, when a print job is received, an application name used in a client terminal is specified from a drawing command of the print job, and standard settings of printing functions provided for each application are read from database files. Thereafter, the standard settings and settings of printing functions of the print job are compared. When the settings are different, after carrying out a warning processing, setting of printing functions based on the standard settings is carried out, and image processing and printing processing based on the set printing functions are executed. In this way, while simplifying settings of printing functions in the client terminal, image processing and printing processing by appropriate printing functions are possible.

7 Claims, 8 Drawing Sheets

U.S. PATENT DOCUMENTS

| | | |
|---|---|---|
| 6,433,884 B1 | 8/2002 | Kawakami |
| 6,537,232 B1 | 3/2003 | Kucharczyk et al. |
| 6,570,668 B1 | 5/2003 | Misner |
| 6,661,530 B1 | 12/2003 | Munetomo et al. |
| 6,718,490 B1 | 4/2004 | Takemoto et al. |
| 6,940,614 B2 | 9/2005 | Subramaniam |
| 2002/0175958 A1 | 11/2002 | Natori |

FOREIGN PATENT DOCUMENTS

| | | |
|---|---|---|
| JP | A-08-123939 | 5/1996 |
| JP | A-8-147118 | 6/1996 |
| JP | A-08-185295 | 7/1996 |
| JP | A-10-23281 | 1/1998 |
| JP | A-10-301723 | 11/1998 |
| JP | A-11-15610 | 1/1999 |
| JP | A-11-346314 | 12/1999 |
| JP | A-2000-353081 | 12/2000 |

OTHER PUBLICATIONS

Yoshiharu Inomata, "Adobe Workshop—Full of useful functions not yet known! A lecture for handling data in Illustrator 8.0", Agosoto No. 09, Agosto, Apr. 21, 1999, No. 9, pp. 104-107.

Jin Kamikouchi, "DTP compliant lecture for printing company salesman by Jin Kamikouchi No. 11—To complete inputting manuscript by data in Illustrator (1)", Professional DTP, Kougakusya, Sep. 1, 1998, pp. 112-114.

FIG. 2A

```
% PS·ADOBE·3.0
%%TITLE:¥203H¥203L¥203¥205¥203¥201¥203¥223¥203GL)
%%CREATOR:QUARK XPRESS¥376 4.10R2:ADOBE PS8.7.0)
%%CREATION DATE:  (11:36   AM      2001¥224N     4¥214216
9¥223¥372¥214¥216¥227J¥223¥372)
```

FIG. 2B

```
%%BEGIN PROCSET:QUARK XPRESS    4.12.02
```

FIG. 5

| WARNING MESSAGE |
|---|

THERE IS AN IMAGE IN RGB FORMAT.

TITLE: ○ ○ ○ ○
: 2/30 PAGE
: 5/30 PAGE

| DISPLAY PREVIEW | CLOSE |

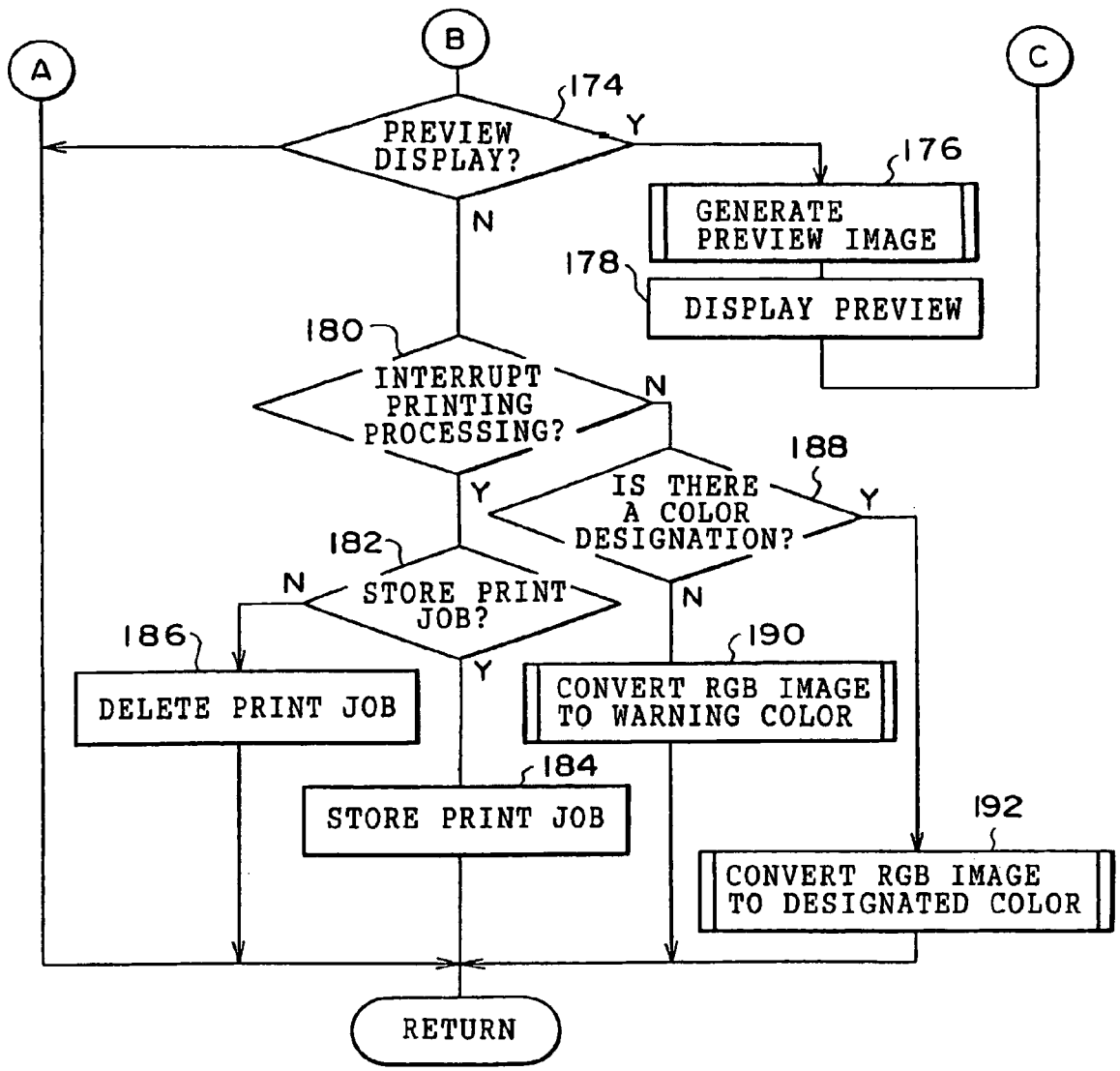

FIG. 7

WARNING MESSAGE

THERE IS AN IMAGE IN RGB FORMAT.

TITLE: ○○○
: 1/15 PAGE         5/15 PAGE    . . . . .

PRINTING  □ INTERRUPT    DATA IN       □ DELETE
                         SERVER        □ STORE

□ CONTINUE     IMAGE         □ CONVERT
                         CONVERSION    □ DO NOT CONVERT

□ WARNING COLOR  ▢▼
                                       □ DESIGNATE

DISPLAY       EXECUTE
                         PREVIEW

IMAGE PROCESSING DEVICE

This is a Continuation of application Ser. No. 11/706,361 filed Feb. 15, 2007, which is a Continuation of application Ser. No. 10/173,019 filed Jun. 18, 2002. The disclosure of the prior applications are hereby incorporated by reference herein in their entirety.

BACKGROUND OF THE INVENTION

1. Field of the Invention

The present invention relates to an image processing device carrying out, at an image processing terminal, image processing on the basis of image data generated by various types of applications, or on the basis of drawing commands.

2. Description of the Related Art

Digitization has spread to the field of printing processing as well, and the trend toward DTP (Desktop Publishing) has advanced. In this way, a page layout is generated by generating, trimming, editing, and the like of an image in a processing device such as a personal computer, a work station, or the like by using applications. Generating of a film is carried out on the basis of this page layout, or generating of a press plate is carried out by direct exposure of a printing plate (CTP: Computer to Plate). Many applications for DTP as well have become popular.

On the other hand, in the field of DTP, when a proof print (proof) for carrying out proofreading of the generated page layout is printed out, a printer such as a color laser printer, a page printer, or the like is used as the print-out device. A processing device generating the page layout and the like is connected as an image processing terminal by a network or the like. In this way, generating of a proof can be easily carried out by drawing commands from respective image processing terminals.

In the applications used in the image processing terminals, various types of printing functions can be designated. By setting the printing functions on the drawing commands, image processing and print-out corresponding to the set printing functions are possible.

Such printing functions are set by a printer driver software (hereinafter, referred to as "printer driver"). Therefore, in order to use various types of printing functions, there is need to provide a printer driver at each image processing terminal.

On the other hand, in Japanese Patent Application Laid-Open (JP-A) No. 11-15610, an application and a printer driver used in a client terminal are provided in a print server or an intermediate server. The application is activated on the server, and the setting of printing functions is carried out.

Further, in JP-A Nos. 8-147118 and 2000-353081, database files, in which settings for each application are stored, are provided in the image processing terminal. Setting of the printing functions for each application is carried out with reference to the database files.

However, in any case, complicated operation for setting printing functions must be carried out on the image processing terminal. Further, there are many cases in which the print job differs in accordance with the application, and the settings of the necessary printing functions will of necessity be changed. A problem arises in that, if there are mistakes in setting or settings are forgotten, a desired printout or the like cannot be obtained.

In particular, in accordance with the application, the color space is in an RGB format, or in a CMYK format. Further, when both are used together, there are cases in which image data, which has been unified into one of these two formats, is desired.

SUMMARY OF THE INVENTION

The present invention has been achieved in consideration of the above-described facts, and the object thereof is to provide an image processing device in which setting of printing functions and the like for each application is easy. Further, another object of the invention is to provide an image processing device which can precisely judge the presence/absence or the like of an image formed from, for example, a specific color space, as a printing function with respect to the color space of an image.

In order to achieve one of the above-described objects, the invention provides an image processing device for carrying out image processing on the basis of drawing commands using applications from an image processing terminal, the image processing device comprising: a storing section for storing settings of printing functions for each application used in the image processing terminal; a reading section for reading information specifying the application from the drawing command; and a setting for setting printing functions by reading the settings from the storing section corresponding to the application specified by the reading results of the reading section.

In accordance with the invention, the settings of the printing functions for each application used in the image processing terminal are stored as standard settings in the storing section.

The reading section specifies the name of the application which generated the drawing command or the image data, from the drawing command inputted from the image processing terminal. The setting section, from the specified application name, reads out and sets the standard settings for each printing function from the storing section.

In this way, regardless of the settings of printing functions in the drawing command, the printing functions are precisely set, and image processing based on the printing functions that are set can be carried out. When printing out is carried out, a printed object on which an accurate image is formed can be obtained.

In the image processing device of the invention, the reading section may read information specifying the application from descriptions following a predetermined code in the drawing command set in accordance with the application, when a description that specifies the application is added in the processing terminal, the reading section may read the added description.

Further, in the invention, the reading section may specify an application name from a predetermined variable name in the drawing command, and the reading section may read an application name from data in a predetermined variable.

Moreover, in the invention, the image processing device may further comprise: a comparing section for comparing settings of printing functions read from descriptions of the drawing command and standard settings of the storing section of printing functions based on an application name; and a warning section for warning that the printing functions are different, on the basis of the results of comparison of the comparing section. Further, the image processing device further preferably comprises: updating section able to, on the basis of a request from the image processing terminal, update the printing functions which are stored in the storing section, and the settings of the printing functions.

The invention provides an image processing device which carries out image processing on the basis of drawing commands using applications from an image processing terminal, the image processing device comprising: extracting section for extracting a color space of an image from image data or the drawing command inputted from the image processing terminal; and warning section for issuing a warning when the extracting section extracts an image of a predetermined color space.

This invention may comprise converting section for converting the image to a predetermined color image, when an image of a predetermined color space is extracted by the extracting section. In this way, the extracted color space can be clarified in the image data or the printed object which is printed-out from a printer or the like.

The converting section may convert the image to a warning color based on a setting stored in a storing section, or may convert the image to a color image designated from the image processing terminal.

Further, the extracting section may be an extracting section which extracts an image in RGB format as the color space.

Moreover, the warning section may display a predetermined warning message on the image processing terminal.

Further, the warning section is not limited to one which displays a warning message. An arbitrary warning method can be used on a printed object which is printed-out by using a printout device such as a printer or the like, provided that the extracted image is clear.

BRIEF DESCRIPTION OF THE DRAWINGS

FIGS. 2A and 2B are respectively schematic diagrams showing main portions of output codes in PostScript format.

FIG. 5 is a schematic diagram showing one example of display of a warning message on a monitor of a client terminal.

FIGS. 6A and 6B are flowcharts showing another example of processing in RGB image warning.

FIG. 7 is a schematic diagram showing one example of display of processing selection which accompanies a warning message on the monitor of the client terminal.

DETAILED DESCRIPTION OF THE INVENTION

Figure 1:
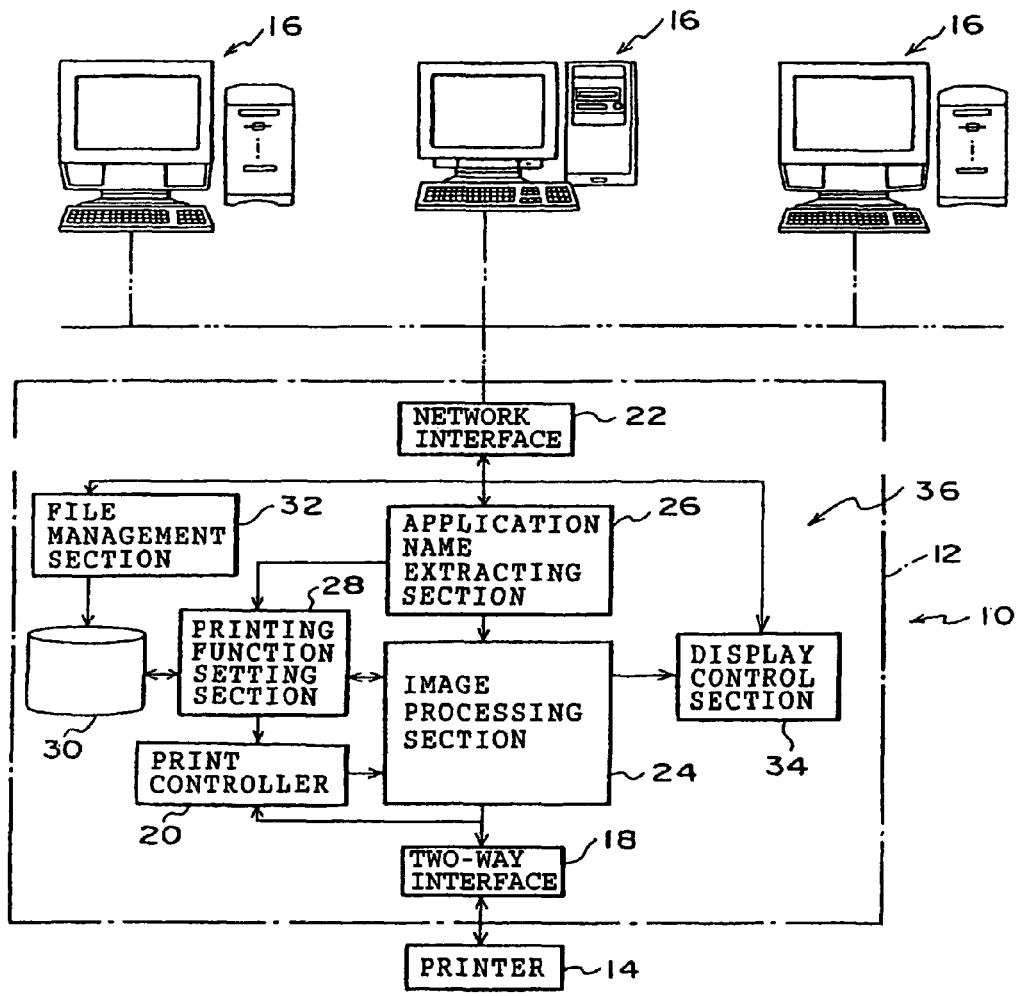
FIG. 1 is a schematic block diagram of a printing system applied to the present embodiment.

Hereinafter, embodiments of the present invention will be described with reference to the drawings. In FIG. 1, a schematic structure of a printing system 10 applied to the present embodiment is shown.

The printing system 10 has an image processing device 36 at a print server 12 which is structured by adding a PCI board having predetermined functions to, for example, a personal computer having a general structure (PC). Further, a printer 14 is connected as a printout device to the print server 12.

Further, a personal computer, a work station, and the like are connected as client terminals 16 to the print server 12. The client terminals 16 are used for DTP which carries out image processings, such as generating, trimming, editing, and the like of an image, by using various types of applications. The image processing device 12 carries out printing processing on the basis of drawing commands from these client terminals 16.

Note that, the printing system 10 may include a plurality of printers 14 connected to the print server 12. Alternatively, the plurality of client terminals 16 may be connected to the print server 12 via a network such as a LAN, a WAN, or the like.

Further, in the present embodiment, description is given of a case in which the image processing device 36, to which the invention is applied, is provided in the print server 12. However, the invention is not limited to the same. The image processing device 36 may be provided in, for example, any of various types of servers disposed in the network, provided that the image processing device carries out image processing on the basis of image data and drawing commands inputted from the client terminals 16. Namely, any arbitrary structure can be used provided that the image processing device of the invention carries out image processing on the basis of image data and drawing commands.

The print server 12 in which the image processing device 36 is provided has a general structure in which an external memory such as a ROM, a RAM, an HD, or the like is provided at the print server 12, and the print server 12 operates in accordance with an operation program stored in a ROM, and executes processings on system graphics, images, characters, tables, or the like, on the basis of programs stored in the ROM or the external memory.

Further, the print server 12 is provided with input devices such as a keyboard, a mouse (neither are illustrated), or the like, and a display device such as a CRT display or the like. Further, in the print server 12 as well, printing processing of an image displayed on the display device is possible (WYSIWYG function).

Namely, a two way interface 18 such as the Ethernet and a print controller 20 are provided in the print server 12. The print controller 20 is connected to the printer 14 via the two way interface 18.

An image processing section 24 is formed in the image processing device 36 in the print server 12. The image processing section 24 generates raster data on the basis of image data and drawing commands inputted as a print job. Due to the raster data being controlled by the print controller 20 and being outputted to the printer 14, a printed object based on the print job can be obtained.

On the other hand, a network interface 22 is provided in the print server 12. Drawing commands in accordance with an image file are inputted from the client terminals 16 via the network interface 22. The print server 12 has a general structure in which printing processing based on the drawing commands is carried out.

By using various types of DTP applications such as, for example, PhotoShop, Illustrator (both trade names of products of Adobe Systems Incorporation), QuarkXPress (the trade name of a product of Quark, Inc.), or the like, the client terminal 16 carries out image processings such as image generating, trimming, editing, and the like. Note that, hereinafter, description will be given of an example in which these applications generate a page layout or the like in PostScript format.

The page layout generated by the client 16 is used in generating of a film used in exposing a printing plate by a color electronic plate making system (CEPS), or is used in exposing a printing plate in direct plate making (CTP). Printing processing is carried out by a press plate generated on the basis of this page layout.

In a color electronic plate making system or a direct plate making system, before generating of a press plate based on the page layout generated by the client terminal 16, a proof print which is called a color proof or the like (referred to as a "proof" hereinafter) is generated.

When carrying out proof printing, the drawing commands from the client terminal 16 and the print job containing the page layout are outputted to the printer server 12. In this way, the print server 12 generates a proof based on the print job.

The page layout inputted from the client terminal 16 to the print server 12 may be in YMCK format, or may be in RBG format, or may be such that both of these formats are used. In the image processing section 24, raster data of, for example, the respective colors of Y, M, C, K are generated from the print job, and are outputted to the printer 14.

An application name extracting section 26 and a printing function setting section 28 are provided in the image processing device 36. The application name extracting section 26 receives a print job transmitted from the client terminal 16, and reads, from the print job, the name of the application which generated the page layout.

The client terminal 16 applied to the present embodiment outputs a print job by using, for example, a PostScript driver. The application name extracting section 26 determines the name of the application which generated the page layout, by reading the application name recorded in the comments of the PostScript.

Namely, as shown in FIG. 2A and FIG. 2B, in the code of PostScript, comments are written after the code %%. From this, the application name extracting section 26 extracts the code %%, and reads the character string after the code %%. For example, in PostScript, as shown in FIG. 2A, because the application name is written after "%%Creator:", the application name is read from the character string following "%%Creator:" at the application name extracting section 26.

Further, as shown in FIG. 2B, when an application name is written after "%%BeginProcSet:", the character string after the code %% is read.

On the other hand, an external memory 30, such as a HD, and a file management section 32 managing database files stored in the external memory 30 are provided in the print server 12. In the external memory 30, standard settings of printing functions for each application are stored as database files.

In the printing function setting section 28, the standard settings of printing functions for the printing functions stored in the external memory 30 are read from the application name extracted at the application name extracting section 26, and setting of printing functions is carried out.

In the image processing section 24, raster data is generated by carrying out image processing on the basis of the settings of the printing function setting section 28, and the generated raster data is outputted to the printer 14.

The file management section 32 can update or add printing functions in the database files and can modify the settings of the printing functions in accordance with requests from the client terminal 16. Further, the file management section 32 can update or add printing functions in the database files on the print server 12, and can modify the settings of the printing functions (modify the standard settings).

Example of printing functions provided in the image processing device 36 or the print server 12 are various types of warning functions for a processed image and image processing functions such as "RGB image warning", "RGB black replaced with K", "K overprint", "hair line warning (thin line warning)", "merging of separate plates", "RGB color correction", "CMYK color correction", and the like, as well as special printing functions such as double sided printing and Nup printing and the like, and also various types of conventionally known processing functions based on the performance and the like of the printer 14 and applications such as the finishing functions of stapling, punching, and the like.

Note that settings for these printing functions are stored in the database files. However, hereinafter, "RGB image warning" and "RGB black replaced with K" will be described as examples of printing functions.

"RGB image warning" notifies or warns whether or not there is, in the page layout, an image whose color space is RGB format (hereinafter, referred to as an "RGB image"). Namely, warning or notice is given such that, when an image in CMYK format and an image in RGB format both exist, the image in RGB format is extracted and it is clarified that the image is in RGB format.

Generally, in printing using a press plate, a color image is separated into respective color components of C (cyan), M (magenta), Y (yellow), and K (black), and press plates on which images of the respective color components are formed are generated, and superposed printing is carried out.

On the other hand, there are applications which generate a layout or the like in RGB format. However, among applications applied to DTP, there are applications which can generate a page layout in CMYK format, and paste an RGB image into the page layout.

If an RGB image is contained in the page layout when a press plate for printing is generated, the image is not separated into the respective colors of CMYK, and is expressed as an image of the respective components of CMYK. Therefore, if printing is carried out by using a press plate generated from a page layout containing an RGB image, the RGB image appears as a "black" image on a color image.

Accordingly, there are applications in which it is necessary to clarify whether there is an RGB image or not when proof printing is carried out. Thus, "RGB image warning" judges whether or not an RGB image is contained in the page layout, and issues a warning when an RGB image is contained.

A display controlling section 34 is provided in the print server 12. When an RGB image is extracted from the page layout, the display controlling section 34 displays a warning dialog on an unillustrated monitor of the client terminal 16. In this way, the RGB image warning can be verified at the client terminal 16 which inputted the print job.

"RGB black replaced with K" replaces an image of black color in an RGB image with K color in CMYK format. In this way, when printout is carried out by the printer 14, the black color in RGB format becomes clear.

"K overprint" is a function of outputting a character or a graphic which is 100% black by overprinting. In this way, image conversion is carried out such that the character or the graphic which is 100% black appears clearly on a printed object. By this function, although marked effects can be obtained with respect to an application generating an image data in RGB format, such as Word or the like generating an image data in RGB format, effects are not achieved in an application such as QuarkXPress or the like generating an image data in CMYK format.

"Merging of separate plates" is a function which merges image data divided and outputted as black-and-white images of the respective color plates of a C plate, an M plate, a Y plate, and a K plate in an application, and outputs it as a color image. There is no such separating function in applications outputting image data in RGB format such as Word, Excel, and the like. Therefore, applying this "merging of separate plates" function adds unnecessary overhead, and is therefore not preferable.

"Hair line warning" gives warning when there is a thin line of a predetermined thickness or less, by clarifying the image. Namely, the resolution of a printed object using a press plate is 1200 dpi to 2400 dpi, and the application can output an image having this resolution.

Because the resolution of the printer 14 or the like is about 600 dpi which is low, by converting an image smaller than this to the resolution, blurring or the like does not occur on a printed object. However, if a line image, at which there is the possibility that blurring or disappearance may occur on a printed object using a press plate, is outputted in accordance with the resolution of the printer 14, accurate proofreading is impossible. At such times, by using the "hair line warning" function, an appropriate judgement with respect to thin line images is possible.

"Spot color correction" is a function simulating colors of spot color inks other than C, M, Y, K used during printing. There are cases in which this function cannot be used depending on the application. Namely, this function can be used in QuarkXPress and the like which generate image data in CMYK format, but cannot be used in Word, Excel, or the like. Therefore, when this function is set, unnecessary overhead is added.

Further, "RGB color correction" and "CMYK color correction" correct the respective colors, such that the colors at the time of carrying out superposed printing of the respective colors of CMYK by using press plates can be simulated.

The database files stored in the external memory 30 are, along with printing functions for each application, stored as standard settings of the respective printing functions on the printing system 10. In Table 1, examples of printing functions and standard settings are shown.

TABLE 1

|  |  | Applications | | | |
| --- | --- | --- | --- | --- | --- |
|  |  | QuarkXPress | PhotoShop | Word | Excel |
| Printing functions | RGB image warning | ON | OFF | OFF | OFF |
|  | RGB black replaced with K | Job setting | ON | ON | ON |
|  | K overprint | OFF | OFF | ON | ON |
|  | Hair line warning | Delete | Delete | OFF | OFF |
|  | Merging of separate plates | Job setting | Job setting | OFF | OFF |
|  | RGB color correction | OFF | Job setting | ON | ON |
|  | CMYK color correction | ON | Job setting | OFF | OFF |
|  | Spot color correction | Job setting | Job setting | OFF | OFF |

In the image processing device 36, applications are classified into applications, which generate image data in RGB format, such as Word, Excel, and the like, and applications, which generate image data in CMYK format such as QuarkXPress and the like, and applications, which can generate image data in both formats (color spaces) such as PhotoShop and the like. Further, settings, which are standard and desirable in accordance with the main purpose of use of the respective applications, are the standard settings.

Note that "erasing" in the hairline warning is a setting carrying out conversion processing with respect to a corresponding image so as to erase the extracted thin lines. "Job setting" uses the settings on the drawing commands outputted from the client terminal 16.

Further, Table 1 shows examples of applications and standard settings of portions of the printing functions for the applications. However, the printing functions and the standard settings of the invention are not limited to the same.

In this way, for example, when a page layout generated by PhotoShop is inputted as a print job and "RGB image warning" of the inputted print job is turned on and "RGB black replaced with K" is turned off, both of "RGB image warning" and "RGB black replaced with K" are changed to be off from the database files of the external memory 30.

Further, when a page layout generated by QuarkXPress is inputted as a print job and "RGB image warning" of the inputted print job is turned off and "RGB black replaced with K" is turned on, from the database files of the external memory 30, "RGB image warning" is changed to be on and "RGB black replaced with K" is changed to be off, and the settings of the print job are applied.

On the other hand, in the image processing section 26, when raster data is generated from the print job inputted from the client terminal 16, processing based on the settings of the printing functions is carried out. At this time, when "RGB image warning" is set to be on, it is judged whether or not an RGB image is contained in the page layout, and when an RGB image is contained, the RGB image warning dialog is displayed on the monitor of the client terminal 16.

Further, in the image processing section 24, if black color is extracted in RGB format when "RGB black replaced with K" is set, the black color is converted to K color at the time of separation in CMYK format.

Figure 3:
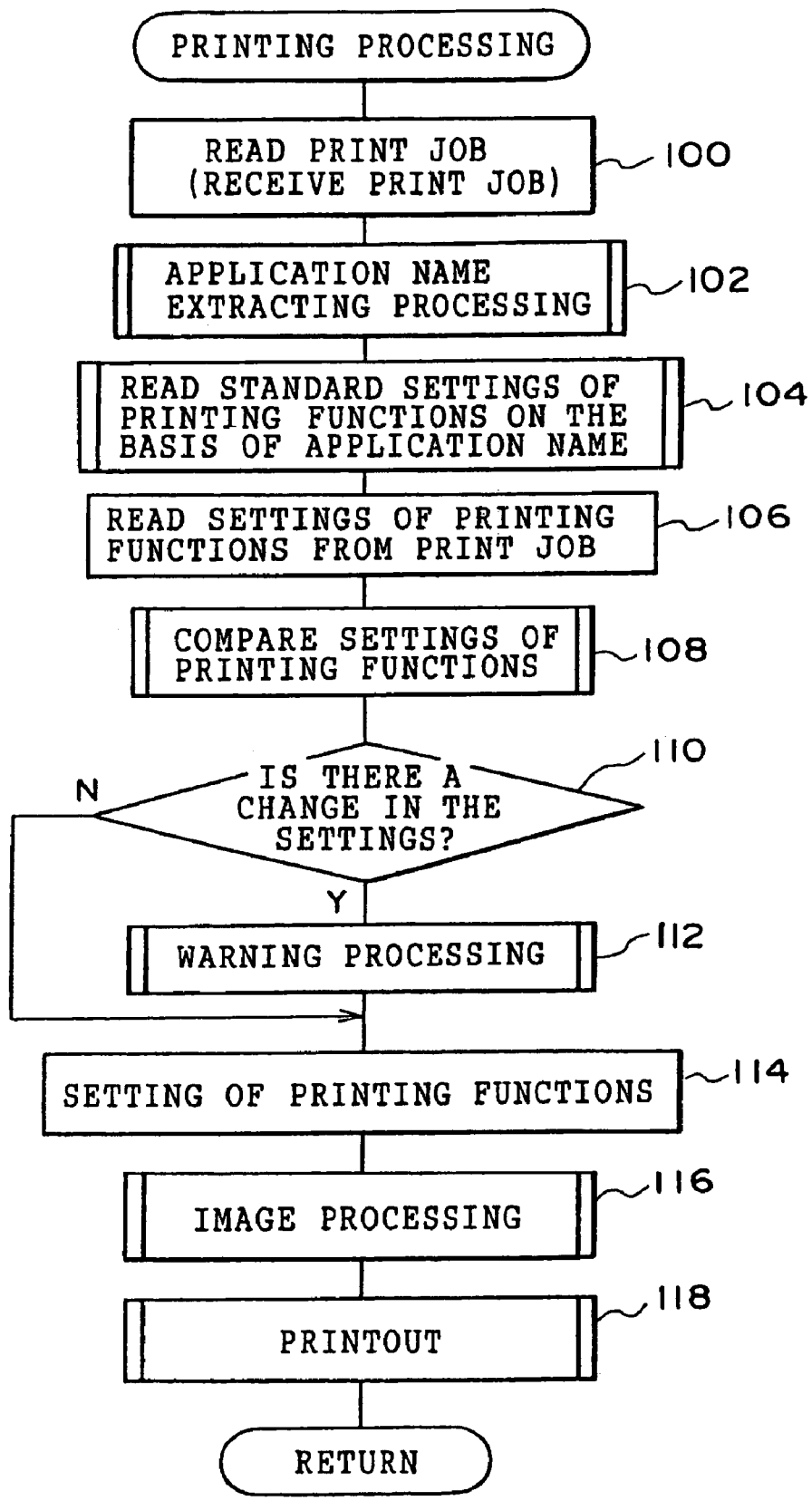
FIG. 3 is a flowchart showing an overview of printing processing in a print server applied to the present invention.

Hereinafter, as the operation of the present embodiment, an overview of the processings in the print server 12 will be described. In FIG. 3, the flow of processings in the print server 12 for a print job is shown. The routine is executed by a print job being inputted from the client terminal 16. In the first step 100, the print job is read.

When the print job is read, in next step 102, the name of the application which generated the page layout inputted as the print job is extracted. For example, if the page layout is in PostScript format, as shown in FIG. 2A or 2B, the extraction of the application name reads a character string corresponding to the application name from the comments written in the code %%, and judges that this character string is the application name.

In next step 104, on the basis of the extracted application name, the standard settings of the printing functions are read from the database files of the external memory 30. Further, in step 106, setting of the printing functions on the print job are read from the drawing commands of the print job. In step 108, the settings of the printing functions are compared, and it is verified whether there are setting changes or not (step 110).

In this way, when there is a change between the standard settings stored in the data file and the settings on the drawing commands of the print job, the judgement in step 110 is affirmative, and the routine proceeds to step 112. In this step 112, changing of the settings of the printing functions to the standard settings is notified by display as a warning message on the monitor of the client terminal 16.

Thereafter, in step 114, setting of the printing functions is carried out on the basis of the standard settings of the printing functions for each application stored in the data file of the external memory 30. At this time, the settings of the print job are used for only the printing functions designated as "job setting".

Note that, when changes in the settings of the printing functions are inputted from the client terminal 16 on the basis of the warning message displayed on the monitor of the client terminal 16, the printing functions may be set on the basis of inputted settings. Further, a structure is possible in which the inputted settings of the printing functions are stored as standard settings in the database files of the external memory 30, such that changing/updating of settings of the printing functions is possible.

When setting of printing functions based on the database files stored in the external memory 30 is completed, the routine proceeds to step 116, and image processing is carried out.

At this time, raster data is generated by carrying out processing based on the setting of the printing functions, and printing processing is carried out by outputting the raster data to the printer 14 (step 118).

In this way, due to settings of the printing functions which are a standard on the printing system 10 being stored as database files in the external memory 30, detailed setting of a print job at the client terminal 16 is unnecessary. Therefore, requesting a print job is extremely easy. Further, setting of printing functions corresponding to the application is carried out by extracting the application name from the print job. Therefore, at the client terminal 16, there is no need to carry out designation of the application or setting of printing functions corresponding to the application. Thus, the operation of requesting a print job at the client terminal is facilitated even more.

Further, even when there are mistakes in setting the printing functions or settings are forgotten at the time of requesting of a print job, setting of printing functions corresponding to the application which generated the page layout can be carried out precisely. Therefore, it is possible to reliably prevent execution of image processing and printing processing based on mistakes in generating of the proof or mistakes in setting.

Moreover, a file management section 32 is provided in the print server 12. The data processing, for a database file, of addition, updating, and changing of the settings of the printing functions for each application is possible from the client terminal 16 via the file management section 32. Therefore, management of the data base files on the print server 12 is easy.

Note that, here, an example is given of a print job described in PostScript format, and the application name is extracted from the print job. However, extraction of the application name in the invention is not limited to this.

For example, there are applications which include a program which stores a variable based on the application name in a code to be outputted. In such an application, by extracting the variable, the application name can be specified.

In this way, a variable specifying the application name may be extracted from the code outputted by the application. Further, when specifying of an application name from data in a variable is possible, specifying of the application name may be carried out by reading the data in the variable.

Moreover, the method of executing a drawing code differs in accordance with the application. There are applications in which the outputted drawing code has the feature that the size of the entire drawing code is decreased by redefining a frequently-used drawing command to a short name or the like. With respect to such applications, by grasping the feature of the outputted drawing code and making it into a database, specifying of the application name from the drawing code is possible.

Further, settings of printing functions provided in the client terminal 16 may be customized and description which can specify the application name may be added, and the application name may be specified from the description. In such a case as well, when a print job is outputted by the client terminal 16, specifying of the application name in the print server 12 can be easily carried out, without carrying out key operation such as input or designation of the application name.

In this way, an arbitrary structure can be applied to the extracting of the application name.

Figure 4:
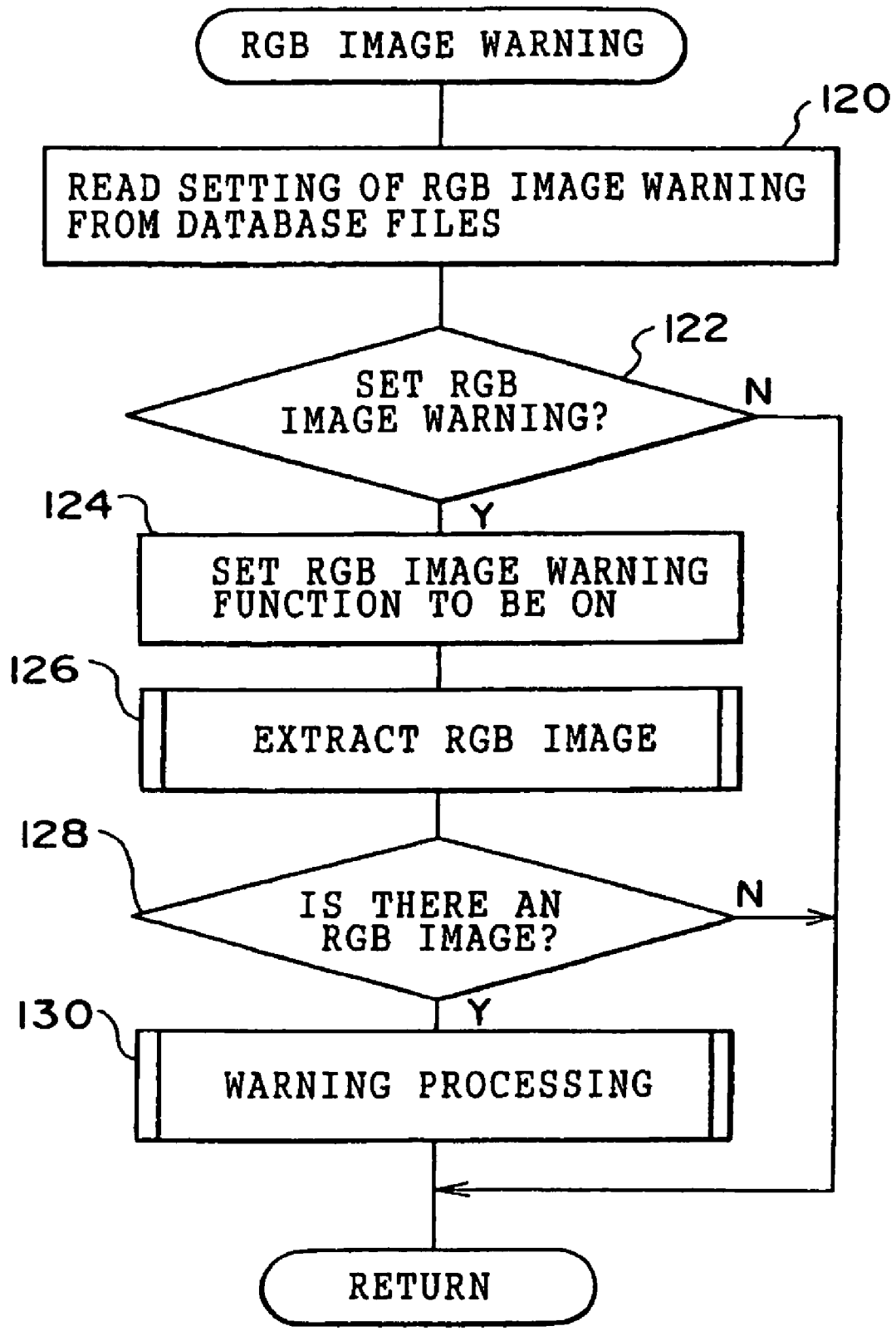
FIG. 4 is a flowchart showing an overview of an "RGB image warning" function.

Next, as one printing function, the overview of processing for "RGB image warning" will be described in accordance with FIG. 4. Note that this "RGB image warning" is one example of, with a basic color space being image data of CMYK format, extracting an image of a color space different than the basic color space, such as an image in RGB format, in the basic color space.

In first step 120, this flowchart reads the standard setting of "RGB image warning" based on the application name, from the database file. In next step 122, it is verified whether the setting of "RGB image warning" is turned on or not, from the read standard setting. By an affirmative judgement, the setting of "RGB image warning" is turned on (step 124).

Note that when the "RGB image warning" is set to be off, the judgement is negative in step 122, and the processing of "RGB image warning" is completed. Further, when the setting is different from the standard settings on the drawing commands of the print job, as described above, it is preferable to give notice of the setting change by carrying out warning processing.

When "RGB image warning" is set to be on, in step 126, extracting of an RGB image from the page layout processed in the image processing section 24 is carried out. The extracting of an RGB image can be applied to a conventionally known arbitrary method such as a method which, for example, judges from a description in PostScript or the like.

In next step 128, it is verified whether there is an RGB image or not. In this way, when an RGB image is extracted from the page layout, the judgement is affirmative in step 128, and the routine proceeds to step 130. In step 130, a warning message is transmitted to the client terminal 16 which requested the print job containing the page layout from which the RGB image is extracted.

In this way, a dialog warning that there is an RGB image in the page layout is displayed on the client terminal 16. As this dialog, for example, the dialog shown in FIG. 5 can be displayed. The dialog can be made to disappear by, for example, clicking a "verification" button or the like. Note that the dialog displayed on the monitor of the client terminal 16 is not limited to this. Provided that the dialog can communicate an accurate message, an arbitrary structure can be applied.

On the other hand, the RGB image warning may have a structure in which image processing is carried out so as to clarify the extracted image. Here, with reference to FIGS. 6A and 6B, one example of a conversion processing of a warning image in "RGB image warning" will be described. Note that, although the conversion processing in "RGB image warning" may be stored as a standard setting in the database files of the external memory 30, hereinafter, description will be given of a case in which conversion processing in "RGB image warning" is carried out on the basis of a designation inputted from the client terminal 16.

This flowchart is executed in accordance with processing of the print job. In first step 160, the standard settings of "RGB image warning" are read from the database files, and in step 162, it is verified whether the printing functions are set or not. At this time, when "RGB image warning" is set, the judgement is affirmative in step 162, and the routine proceeds to step 164, where the setting of "RGB image warning" is turned on.

Thereafter, in step 166, extraction processing of an RGB image is carried out, and in step 168, it is verified whether the RGB image has been extracted or not.

Here, when there is an RGB image in a print job in CMYK format, the judgement is affirmative in step 168, and the routine proceeds to step 170. In this step 170, a dialog for warning of an RGB image is displayed on the monitor of the client terminal 16. The dialog, for example, as shown in FIG. 7, gives notice that there is an RGB image, and requests a designation of processing for the extracted RGB image.

The processing for the RGB image at this time requests designation of whether or not a printing processing, which is the processing for the print job, is to be interrupted, and of whether the print job is to be stored or not when the printing processing is interrupted.

Further, when the printing processing is continued, selection of the processing for the RGB image is requested. In the processing for the RGB image at this time, for example, non-conversion, warning color replacement, or the like can be designated. Further, when warning color replacement is designated, it can be selected whether a warning color set in advance (e.g. magenta) is to be applied as the color, or color designation is to be carried out. In addition to these, a preview display may be carried out.

Figure 6A:
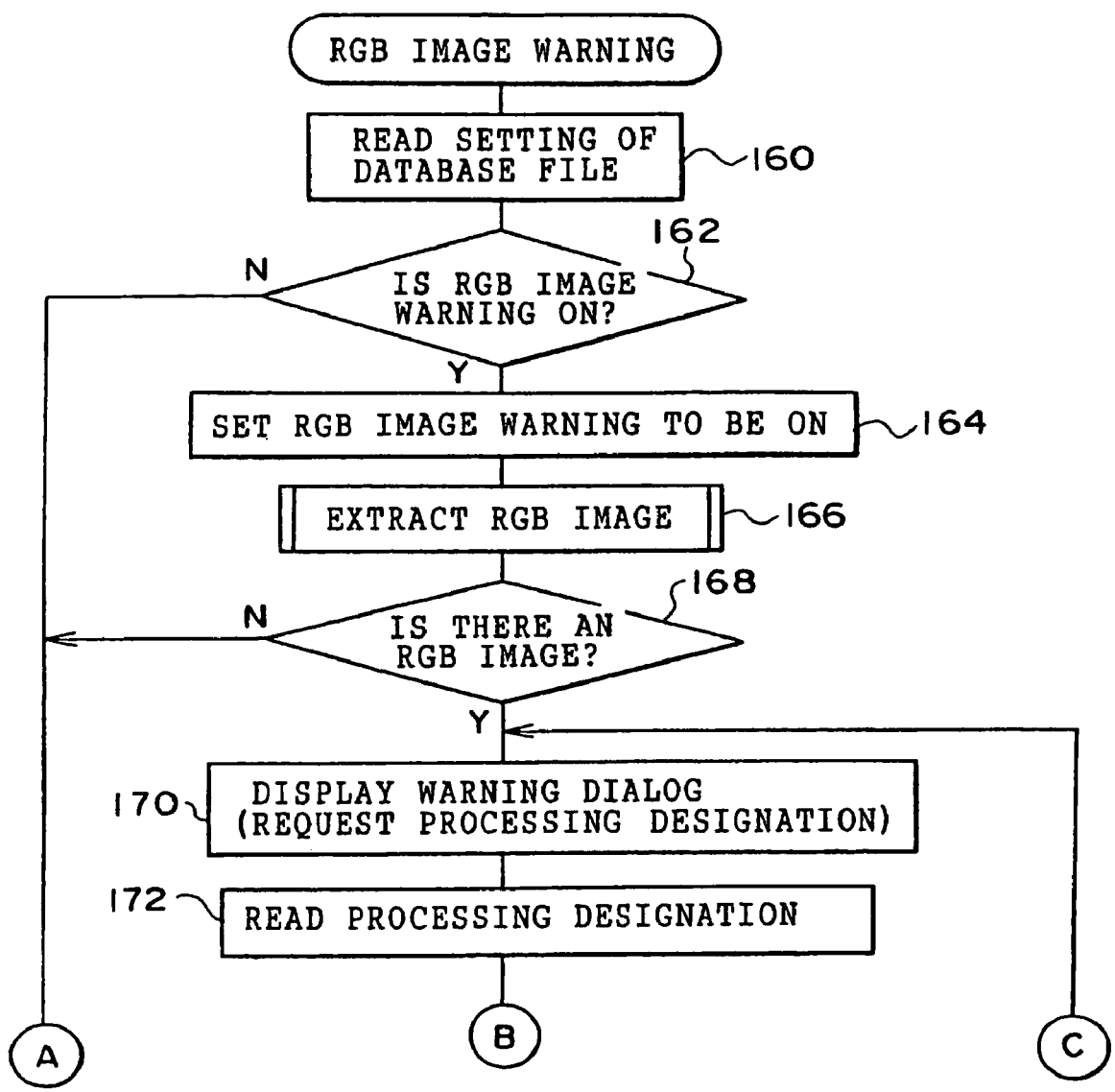

Here, when a designation of processing is inputted in accordance with the display of the dialog, in the flowcharts of FIGS. 6A and 6B, the designation of processing is read in step 172.

Thereafter, in step 174, it is verified whether preview display is selected or not. When a preview display is selected, the judgement is affirmative in step 174, and the routine proceeds to step 176, where an image for displaying, on the monitor of the client terminal 16, a print preview of a page layout in which there is the RGB image, is generated. Further, in step 178, the generated print preview is displayed on the monitor of the client terminal 16. Note that, when the print preview is displayed, the routine proceeds to step 170 in order to request a designation of processing.

This print preview is displayed such that at least the RGB image on the page layout is clarified. At this time, when a warning color conversion or a designated color conversion or the like is designated for the RGB image, the converted image may be displayed.

By displaying the print preview, the RGB image in the print layout can be clearly recognized, and by converting the RGB image and displaying it, a proof in which the RGB image can be accurately recognized can be generated.

When there is no request for display of a print preview, or displaying of the print preview is completed, the judgement is negative in step 174, and the routine proceeds to step 180. In this step 180, it is verified whether or not printing processing for the corresponding print job is to be interrupted.

Here, when there is a designation to interrupt printing processing which is the processing for the print job, the routine proceeds to step 182, and it is verified whether the print job is stored or not. In this way, when storing of the print job is designated, the judgement is affirmative in step 182. The routine proceeds to step 184, and the inputted print job is stored an unillustrated external memory in the print server 12, and the processing for this print job is completed.

In this way, by storing the print job, the page layout of the print job is partially modified. When the print job is requested again, the print job stored in the external memory can be used for data of unmodified portions and various types of settings. Therefore, for example, when only one portion of many of page layouts is modified or the like, it is possible to aim for shortening of the transmitting time of data and the like.

On the other hand, when storing of the print job is not designated, the judgement is negative in step 182. The routine proceeds to step 186, where the received print job is deleted, and the processing for this print job is completed.

On the other hand, when the print job is to be continued, the judgement is negative in step 180, and the routine proceeds to step 188. In step 188, it is verified whether a predetermined warning color has been designated or color designation has been carried out.

Here, when a warning color set in the print server 12 is designated, the judgement is negative in step 188, and the routine proceeds to step 190. In step 190, the RGB image is converted to a warning color (magenta).

Further, when a color for converting the RGB image is designated, the judgement is affirmative in step 188. The routine proceeds to step 192, and image conversion is carried out such that the extracted RGB image is printed out in the designated color.

In this way, on a printed object outputted from the printer 14, the RGB image is clarified. Accordingly, when a proof is generated, a proof by which appropriate proofreading is possible can be printed out.

Note that, in the present embodiment, description was given of a case in which the RGB image is converted to a warning color image. However, the invention is not limited to the same. For example, a warning message clarifying that the image is an RGB image may be printed out on a printed object outputted from the printer 14. Further, the RGB image may be clarified by surrounding the periphery of the RGB image with a contour having a predetermined width and a predetermined color. Or, setting may be carried out such that a warning page clarifying the RGB image is printed out on another printed object.

Note that the above-described present embodiment does not limit the invention. For example, in the present embodiment, an example of generating a proof was described. However, the present invention can be applied, not only to this, but also to various types of printings using printing functions provided in various types of applications.

In accordance with the above-described invention, the application name is specified from a drawing command which the image processing terminal outputs by using the application. Printing functions are set, on the basis of the application name, by using standard settings stored in the storing section. In this way, because setting of various types of printing functions is not bothersome, the excellent effect that drawing processing, such as a proof printing or the like, is extremely easy can be obtained.

Further, in the invention, as a printing function, by extracting and giving warning of the presence/absence of different color spaces such as an image in CMYK and an image in RGB and the like, the presence/absence of a combination of images which cannot be clarified in display on a monitor or in output from a printout device can be exactly judged.

What is claimed is:

1. An image processing device, comprising:
   a judging section that judges, prior to generating a press plate for a page layout, whether or not the page layout includes image data to be warned;
   an image processing section that executes image processing on the page layout when the judging section judges that the page layout includes the image data, the image processing including processing to clarify for a user whether the page layout includes the image data or not; and
   an output section that outputs the executed page layout to a display for a preview in a case that the image processing section executes the image processing to the page layout,
   wherein the image data to be warned is image data in RGB color space.

2. The image processing device according to claim 1,
   wherein the image processing section executes the image processing so that a user can recognize, in a state where the executed page layout is displayed on the display as the preview, whether the page layout includes the image data or not.

3. The image processing device according to claim 1, wherein the image processing section clarifies the image data to be warned by surrounding a periphery of the image data to be warned with at least a contour.

4. An image processing device, comprising:

a judging section that judges, prior to generating a press plate for a page layout, whether or not the page layout includes image data to be warned;

an image processing section that executes image processing on the page layout when the judging section judges that the page layout includes the image data, the image processing including processing to clarify for a user whether the page layout includes the image data or not; and an output section that outputs the executed page layout to a display for a preview in a case that the image processing section executes the image processing to the page layout, wherein the output section provides a user interface that allows a user to set a color for warning, and the image processing section executes the image processing based on the color specified by the user setting.

5. The image processing device according to claim 4, wherein the image data to be warned is at least one of image data in RGB color space, a hairline, and image data set to overprint.

6. An image processing method, comprising:

judging, prior to generating a press plate for a page layout, whether or not the page layout includes image data to be warned;

executing image processing on the page layout when judging that the page layout includes the image data, the image processing including processing to clarify for a user whether the page layout includes the image data or not; and outputting the executed page layout to a display for a preview in a case that the image processing to the page layout is executed, wherein the image data to be warned is image data in RGB color space.

7. A non-transitory computer readable storage medium storing a program causing a computer to execute a process for image processing, the process comprising:

judging, prior to generating a press plate for a page layout, whether or not the page layout includes image data to be warned;

executing image processing on the page layout when judging that the page layout includes the image data, the image processing including processing to clarify for a user whether the page layout includes the image data or not; and outputting the executed page layout to a display for a preview in a case that the image processing to the page layout is executed, wherein the image data to be warned is image data in RGB color space.

* * * * *